July 15, 1947.            F. A. HUESER            2,423,888
DEVICE FOR MEASURING THE LEVEL OF A MOLTEN METAL BATH
Filed Feb. 17, 1945
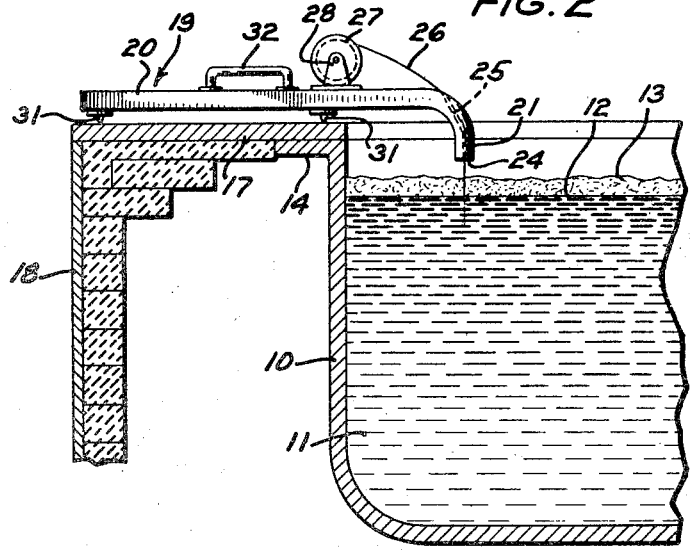
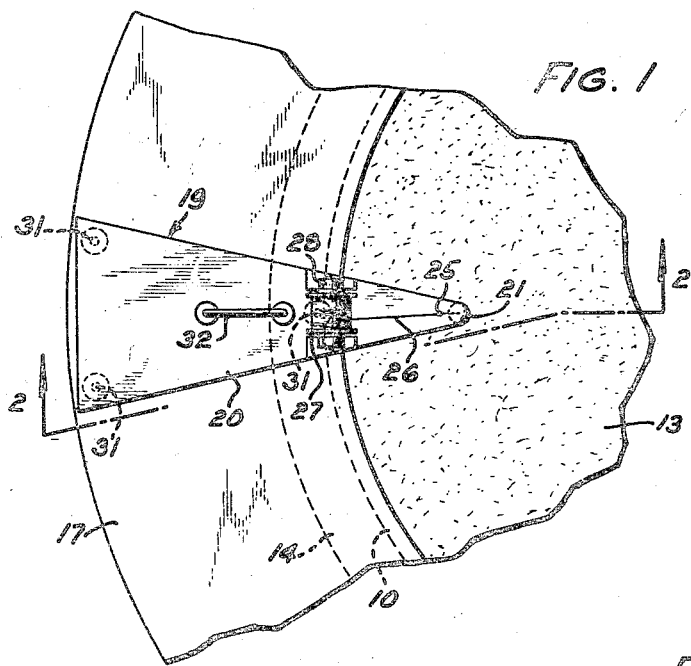
INVENTOR.
F. A. HUESER
BY
ATTORNEY Patented July 15, 1947

2,423,888

UNITED STATES PATENT OFFICE 2,423,888

DEVICE FOR MEASURING THE LEVEL OF A MOLTEN METAL BATH

Frank A. Hueser, La Grange, Ill., assignor to Western Electric Company, Incorporated, New York, N. Y., a corporation of New York Application February 17, 1945, Serial No. 578,389

4 Claims. (Cl. 33—126.7)

This invention relates to measuring devices and particularly to such devices for use in gaging the level of a liquid bath.

The invention is particularly useful in taking inventory of molten metal, for example, in checking the level of a molten metal bath, such as zinc and lead, contained in a pot with or without a layer of flux covering it with an equal degree of accuracy. In some installations, the pot may contain seven tons or more of molten metal and a small difference in the measurement of the level of the surface of the metal involves a large amount of metal and thus an inaccurate inventory of metal on hand.

An object of this invention is the provision of a simple and practical measuring device for efficiently and accurately gaging the level of a liquid bath.

In accordance with the above object, the present invention, in one embodiment thereof, comprises a base having a plurality of depending locating pins arranged to rest on a predetermined horizontal surface of the structure supporting the pot or container holding the bath of molten metal. Extending downwardly from the base and spaced from the inner peripheral wall of the pot is a guide arm having its lower horizontal surface, which is positioned above the level of the bath, constituting a gaging point. Threaded through a guide aperture formed in the guide arm and extending from a coiled supply mounted on the base and for such a distance beyond the gaging point as to extend for a suitable distance into the molten metal bath is an alloy wire having a melting point below the temperature of the bath to be checked. Thus, when the gaging device is mounted in position upon the pot, the portion of the alloy wire extending into the bath below the level thereof melts away and the remainder of the alloy wire extending beyond the gaging point of the guide arm is then measured and from this measurement the level of the bath and finally the volume of molten metal contained in the pot may be readily determined.

Other objects and advantages of this invention will more fully appear from the following detailed description, taken in conjunction with the accompanying drawing, in which Fig. 1 is a fragmentary plan view of a measuring device embodying the features of this invention for gaging the level of a bath of molten metal contained in a melting pot, the melting pot being shown fragmentarily, and Fig. 2 is an irregular vertical section taken on the line 2—2 of Fig. 1.

Referring to the drawing in detail, wherein one embodiment of the invention, as used in measuring the level of a molten bath of zinc and lead, is illustrated, the numeral 10 indicates a melting container or pot for a bath of zinc and lead 11, having its top surface or level indicated at 12 and a usual layer of flux 13 covering it. The pot 10 is supported by a flange 14 thereof, being welded or otherwise attached to an annular plate 17, in turn mounted on a wall structure 18 surrounding, in spaced relation, the outer peripheral surface of the pot. Suitable heating means (not shown) is provided for keeping the bath 11 molten at a suitable temperature. A more complete description and illustration of the structure for holding the molten bath of zinc and lead 11, which is shown fragmentarily, is not believed necessary to a complete understanding of the measuring device of this invention, indicated in general at 19.

The device 19 comprises, as shown in Fig. 1, a segment-like shaped base member 20, having its narrow end terminating in a downwardly extending arcuate shaped arm 21 (Fig. 2) of substantially circular cross-section at its extremity, its lower annular horizontal end face 24 serving as an established gaging surface or point, which will be referred to hereinafter. An aperture 25 is provided in the arm 21, through which is threaded the outer end of an alloy wire 26 coiled on a supply spool 27 journalled at 28 upon the upper surface of the base member 20. The alloy wire 26 is of a type which has a melting point below the temperature of the molten bath 11, the level 12 of which is to be gaged, so that when entered below the bath level, it will melt away at the surface or level of the bath. For gaging a zinc bath, an alloy wire of tin and lead, such as solder wire, may be used. Depending from the lower surface of the base member 20 are three locating feet or pins 31, which may be of the vertically adjustable type, if desired. The pins 31 engage and rest upon the upper surface of the pot supporting annular plate 17 when the device is being used and thus predeterminedly locate the gaging point 24 on the wire guide relative to the pot and always above the bath level 11. A handle 32 is attached to the upper surface of the base member 20 to facilitate the handling of the device in its use.

In using the measuring device 19 above described, the alloy wire 26 is fed beyond the gaging point 24 for such a length that when the device is predeterminedly located relative to the pot 10 and resting on the plate 17, the end of the wire will extend below the bath level 12 for a suitable distance. Thus, the alloy wire 26, having a melting point below the temperature of the molten bath 11, the level 12 of which is being gaged, is melted away solely below the surface or level of the bath, leaving a length of wire extending beyond the gaging point 24, which length will vary, depending on the level of the bath. No effect on the gaging of the bath level 12 results from the layer of flux 13 on the bath 11 as the alloy wire melts away in line with the surface of the molten metal. The length of the alloy wire 26 extending beyond the gaging point 24 and to the bath level 12 is now measured and, with this measurement known accurately, the volume of molten metal contained in the pot 10 may be readily determined by referring to a table which indicates the contents of the particular pot 10 with various levels of molten metal.

What is claimed is:

1. A device for measuring the level of a molten metal bath in a pot comprising a base predeterminedly located relative to a surface of the pot, means extending from said base providing a gaging point at its outer end surface above the level of the bath, and an alloy element having a melting point below the temperature of the bath carried by said means, extending from said gaging point and into the bath, whereupon the portion thereof below said level melts away, the length of said element extending beyond said gaging point being used in determining the volume of metal in the pot.

2. A device for measuring the level of a molten metal bath in a pot comprising a base predeterminedly located relative to a surface of the pot, apertured guide means extending from said base and providing a gaging point at its outer end surface above the level of the bath, and a supply of alloy wire having a melting point below the temperature of the bath carried by said base with an end threaded through said guide means, extending from said gaging point and into the bath, whereupon the portion thereof below said level melts away, the length of said wire extending beyond said gaging point being used in determining the volume of metal in the pot.

3. A device for measuring the level of a molten metal bath in a pot comprising a base, a plurality of supporting pins depending therefrom for predeterminedly locating and supporting the base in a horizontal plane above a surface of the pot, apertured guide means extending from said base and providing a gaging point at its outer end surface above the level of the bath, and a supply of alloy wire having a melting point below the temperature of the bath carried on said base with its outer end threaded through said guide means, extending from said gaging point and into the bath, whereupon the portion thereof below said level melts away, the length of said wire extending beyond said gaging point being used in determining the volume of metal in the pot.

4. A device for measuring the level of a molten metal bath in a pot comprising a base, a plurality of supporting pins depending therefrom for predeterminedly locating and supporting the base in a horizontal plane above a surface of the pot, an arcuate shaped apertured guide means extending downwardly from said base and providing a gaging point at its outer end surface above the level of the bath, and a rotatably mounted coiled supply of alloy wire having a melting point below the temperature of the bath journalled on said base with its outer end threaded through said guide means, extending from said gaging point and into the bath, whereupon the portion thereof below said level melts away, the length of said wire extending beyond said gaging point being used in determining the volume of metal in the pot.

FRANK A. HUESER.

REFERENCES CITED

The following references are of record in the file of this patent:

UNITED STATES PATENTS

| Number | Name | Date |
|---|---|---|
| 1,501,407 | Le Clair | July 15, 1924 |
| 1,570,790 | Smith | Jan. 26, 1926 |
| 2,200,630 | McCabe | May 14, 1940 |